United States Patent [19]
Kass

[11] Patent Number: 5,980,245
[45] Date of Patent: Nov. 9, 1999

[54] DURABLE GUDGEONS FOR FUSING ROLLERS

[75] Inventor: Allen Kass, Pittsford, N.Y.

[73] Assignee: Eastman Kodak Company, Rochester, N.Y.

[21] Appl. No.: 08/920,969

[22] Filed: Aug. 29, 1997

[51] Int. Cl.[6] .................................................. F28F 5/02
[52] U.S. Cl. .......................... 432/246; 432/60; 464/184; 492/46; 492/53
[58] Field of Search ........................... 432/60, 236, 246; 138/89, 96 R, 109; 285/174, 238; 219/469, 470, 471; 198/790, 791; 492/46, 47, 53; 464/184

[56] References Cited

U.S. PATENT DOCUMENTS

| | | | |
|---|---|---|---|
| 3,906,923 | 9/1975 | Harker | 123/193 CP |
| 4,229,950 | 10/1980 | Fessenden | 64/5 |
| 4,668,111 | 5/1987 | Kapaan | 464/184 |
| 4,724,303 | 2/1988 | Martin et al. | 432/60 |
| 5,094,613 | 3/1992 | Dolcimascolo et al. | 432/60 |
| 5,289,928 | 3/1994 | Maier | 212/253 |
| 5,649,891 | 7/1997 | Kass et al. | 492/47 |

OTHER PUBLICATIONS

*Research Disclosure Bulletin*, Item 13027, "Internally heated roller construction" vol. 130 pp. 23–24, published on Feb. 10,1975, published in Hampshire, UK.

Primary Examiner—Teresa Walberg
Assistant Examiner—Gregory A. Wilson
Attorney, Agent, or Firm—Doreen M. Wells

[57] ABSTRACT

A gudgeon or endcap for a heated roller is provided which substantially reduces heat loss through the ends of the roller and is of sufficient strength and durability to transmit rotation to the rollers during extensive use. The gudgeon is molded from thermoplastic polyimide filled with 20 to 50 weight percent glass fiber. A roller comprising the gudgeon is also provided.

12 Claims, 5 Drawing Sheets

;# DURABLE GUDGEONS FOR FUSING ROLLERS

FIELD OF THE INVENTION

This invention relates generally to heated rollers, and more particularly to gudgeons in driving or supporting engagement with heated rollers.

BACKGROUND OF THE INVENTION

In the printing and paper making industries, heated rollers are commonly used to feed paper sheets and simultaneously perform some processing step on the paper. For example, an heated roller may serve as a pressure roll fuser for electrographic copiers, or as a calendar in making paper. In such applications, the roller is supported by gudgeons, also referred to as endcaps or journals, and is rotated by a drive mechanism connected to the roller through the gudgeons.

Gudgeons attached to fuser rollers perform many functions and so must be constructed to perform them with minimum failure. For example, gudgeons transmit rotational motion from the copier drive mechanism to the roller; they allow the bearing to fit over the gudgeon so that smooth rotational motion is obtained; they must be able to withstand fusing temperatures up to 450° F. without degrading or affecting performance, and; they must be good thermal insulators so that heat transmitted to the bearings and to the frame is minimized. Exposure to high temperatures reduces bearing life.

Heat through the surface of the roller accomplishes the desired fixing of toned images to the sheets or calendering of the paper. In order to decrease heat losses through the ends of the heated roller and to the surrounding environment, it is desirable to construct the roller surface of one material having a high thermal conductivity (such as metal) and the gudgeons forming the ends of the roller of another material having a low thermal conductivity (such as an organic material). Materials of low thermal conductivity, however, generally do not match the metal roller in its physical characteristics of strength, stiffness or thermal expansion. Suitable measures must be taken to minimize the effect of these differences and provide gudgeons that will operate over extended temperature ranges without loosening or becoming eccentric and without inducing excessive stresses in the roller.

Historically, gudgeons have been manufactured with all plastics, such as thermoset epoxy, and thermoset polyimides such as Kinel™ 4504, Fibrite PI-740 & PI-755. The major problem with these materials is that the resin degrades, especially when in contact with the metal core. Degradation is generally characterized by shrinkage which leads to motion of the gudgeon in relation to the core which in turn leads to transmission of torque and rotational motion through the gudgeon. This affects fusing performance to the extent that improper fusing occurs and the fuser roller must be replaced. Gudgeons may also be made of metal such as aluminum and steel, including stainless steel, but with the design of the present invention, the roller or ball bearings would require special lubricant and this would significantly increase the cost of the bearings.

Further problems arise because repetitive heating and cooling of the roller frequently cause the bolts to relax the coupling between the gudgeon and roller or ultimately to fracture.

Several configurations of heated rollers and their end gudgeons are disclosed in *Research Disclosure Bulletin*, Item 13027, Vol. 130, page 23–24, "Internally heated roller construction" published Feb. 10, 1975 in Hampshire, United Kingdom. These configurations are designed to help minimize the problems outlined above, but the durability of gudgeons continues to be a problem. What is needed, then, is an improved gudgeon which prevents substantial heat loss from the ends of a heated roller and which will not degrade or shrink or lose its close fit to the roller core upon repetitive heating and cooling.

SUMMARY OF THE INVENTION

This invention is directed to an improved plastic gudgeon made out of a relatively new material known as Aurum™. This is a high temperature thermoplastic material manufactured by Mitsui Toatsu Chemicals Inc. (Tokyo, Japan). The uniqueness of this material is that at standard operating fusing temperatures, the Aurum™ resin does not degrade. No resin oxidation or depletion is observed. Typically, gudgeons made of Aurum™ can undergo repeated use without significant wear or discoloration. Although some shrinkage of the Aurum™ resin occurs (0.004 inch over a 2.686 inch diameter), no fuser roll failures occurred due to defective gudgeons, based on over 40,000 rollers tested. Previous gudgeon materials used would typically result in 4,000 rollers (or 10%) failing due to gudgeon degradation. An additional advantage of Aurum™ is that the preferred crystalline grade contains a maximum of 40% glass, whereas typical thermoset polyimides contain 60% glass. The reduction of glass in Aurum™ reduces thermal conductivity, thereby reducing the temperature to the bearings and frame during operation, compared to thermoset polyimides. Higher glass content is available in an amorphous form from the same company and is useful where the particular application requires sturdiness and a low transition temperature is not critical. A high (about 60%) glass content is required for thermoset polyimides to obtain high temperature strength.

When fuser rollers are made of Aurum™, resin degradation is negligible, resulting in zero failures from gudgeon wear. Minimal resin degradation eliminates the powdery particulates that are characteristic of the used gudgeons made of thermoset polyimides. When these particulates occur, they must be removed before the core can be recycled. Thus, minimal degradation allows for easier disassembly and recycling of cores.

BRIEF DESCRIPTION OF THE DRAWINGS

In the detailed description of the preferred embodiment of the invention, reference is made to the accompanying drawings, in which.

DETAILED DESCRIPTION OF THE INVENTION

Figures 1, 2:
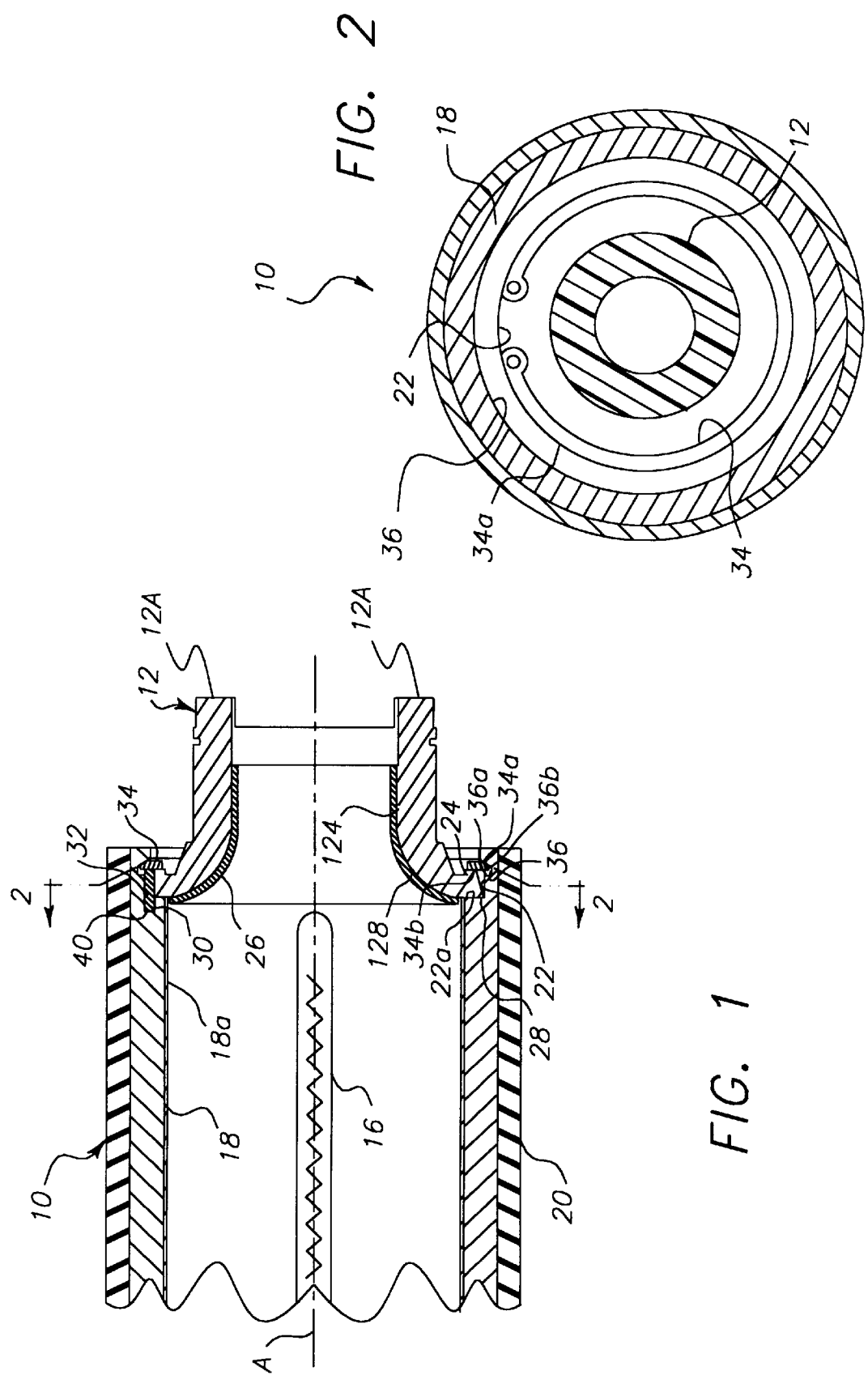
FIG. 1 is a side elevational view in cross-section of one end of a heated roller and its end gudgeon showing the coupling according to this invention.
FIG. 2 is an end elevational view in cross-section of the apparatus of FIG. 1 taken along lines 2—2 of FIG. 1.
Figure 3:
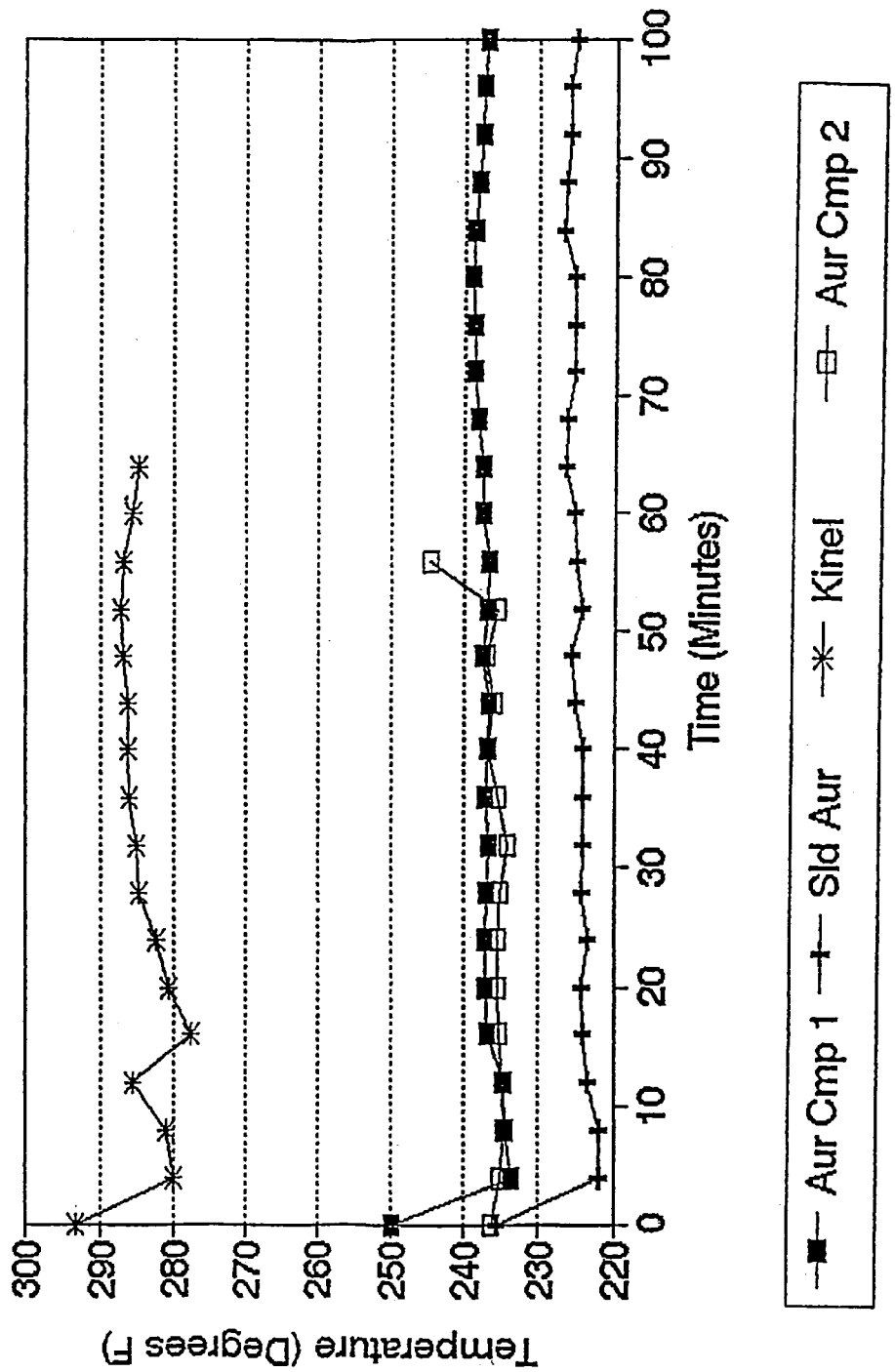
FIGS. 3–6 are the fuser thermal profiles for the lower rear bearing, the upper rear bearing, the upper front bearing and the front fuser frame, respectively. Temperatures were taken during a 110 lb. paper run.
Figure 4:
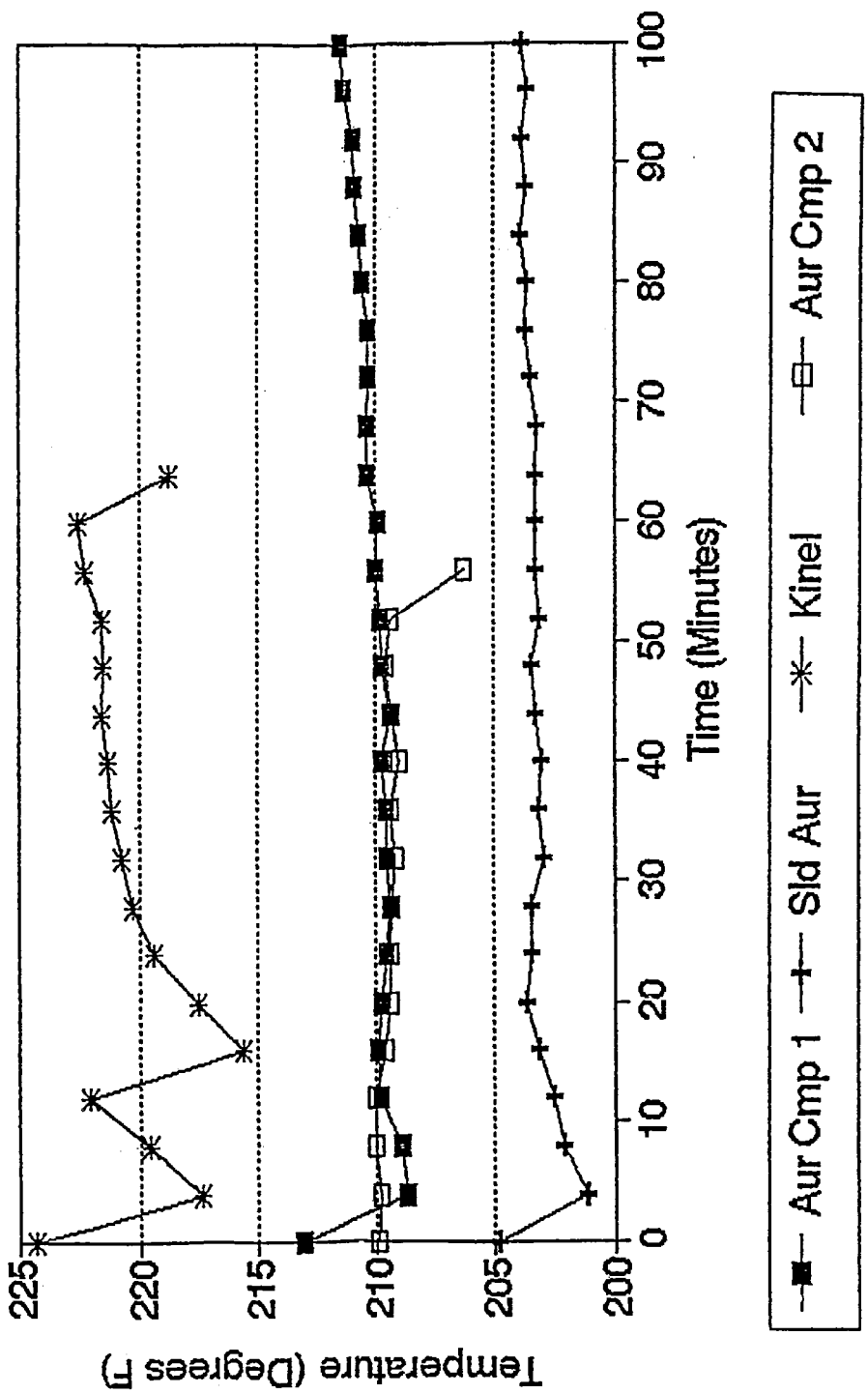
Figure 5:
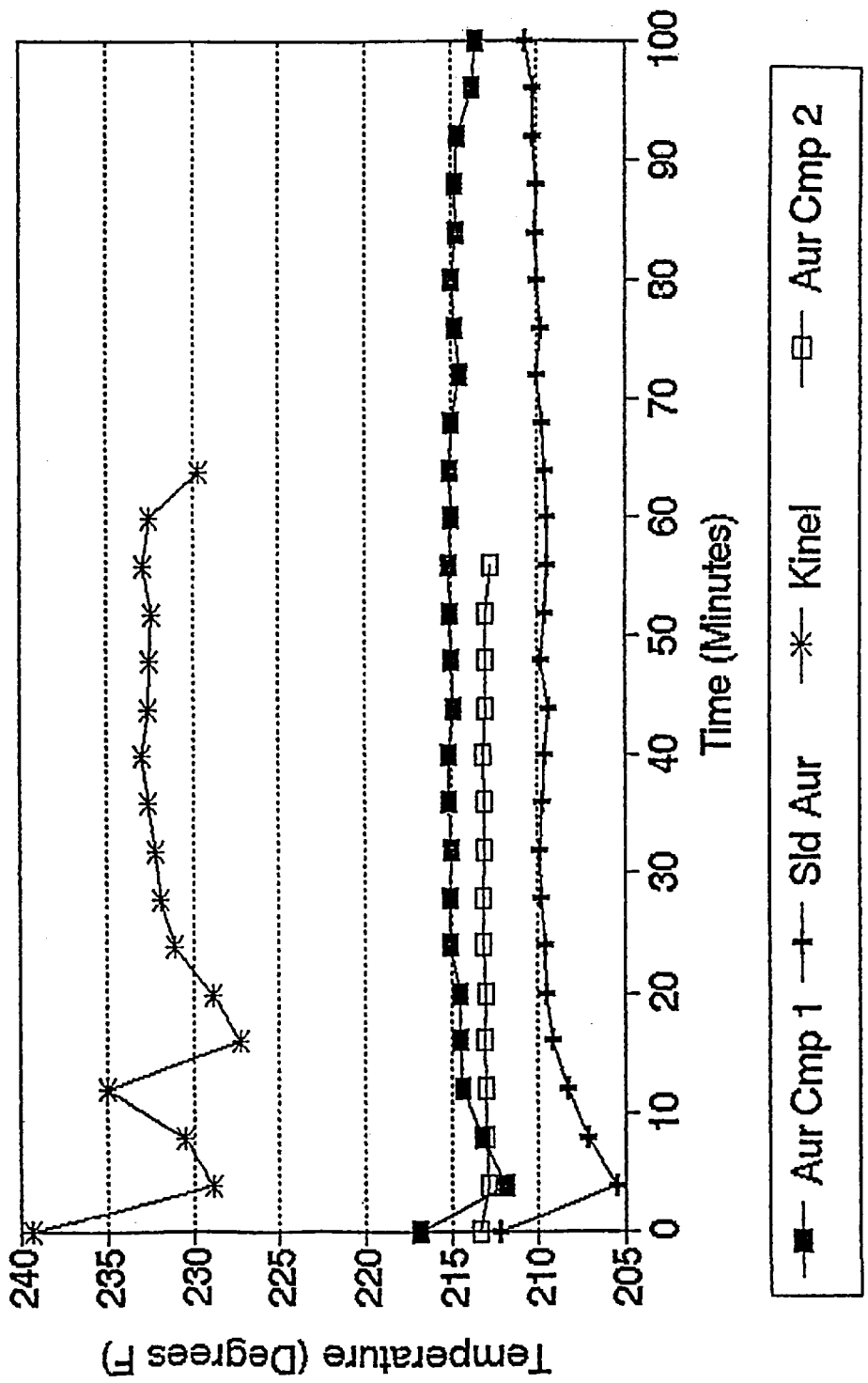
Figure 6:
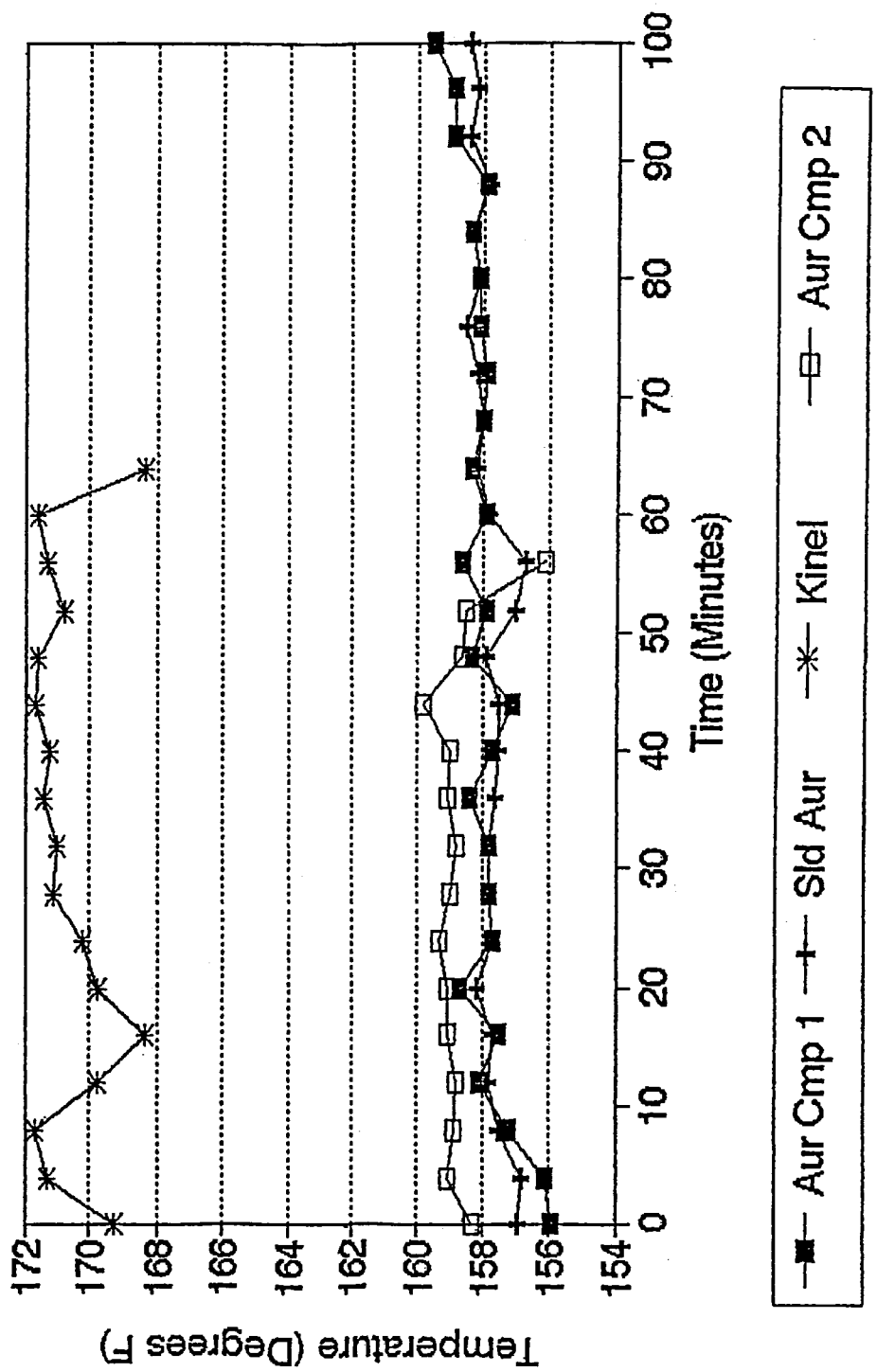

The design of the gudgeon of the invention is similar to that disclosed in U.S. Pat. No. 4,229,950 to Fessenden, the contents of which are incorporated herein in their entirety, except that Aurum™ was not mentioned in the patent. Instead, the materials listed were glass or mineral filled epoxys or phenolics (e.g. Plaston® available from Allied Chemical Corp.) or glass or carbon fiber filled polyimides or polyamides. There was no teaching concerning a preferred filler or a preferred percentage of filler.

U.S. Pat. No. 5,649,891 to Kass et al. discloses a composite gudgeon comprising a metal portion and a polymer portion. For the polymer portion, a long list of useful materials is given in col. 8, lines 1–21, including Aurum™ which was listed as just another commercially available polymer suitable for the claimed composite gudgeon. The preferred polymers taught by that patent are "a polyphthalamide, particularly, Amodel™ from Amoco and a phenolic, particularly, HT750™ from Fiberite." There is no teaching in that patent or in any reference of which Applicant is aware that would lead one skilled in the art to expect the superior results Applicant obtained with Aurum™.

Nor does the company's (Mitsui Toatsu Chemicals, Inc.) list of recommended applications lead to selecting this product for electrophotograhic application in general or heated rollers in particular. The list includes the product's usefulness for automotive and electrical parts, etc., but does not include parts for heated rollers. In any case, nothing in the literature suggests the unexpected results obtained by Applicant. In fact, the manufacturer's promotion literature states that "AURUM has very high heat-resistant properties which are equivalent to thermoset type polyimides." and that the "wear/friction resistant property is, in general, characteristic to polyimide resins, . . . ".

Aurum™ is a glass fiber reinforced thermoplastic polyimide in an amorphous or semi-crystalline state. However, an injection molded Aurum™ article is amorphous due to Aurum's™ extremely slow crystallization rate compared to other typical crystalline polymers. For applications where continuous heat resistance above 450° F. or additional chemical resistance is required, a short post-mold semi crystallization cycle (annealing process) is applied to the amorphous parts. This involves heating the polymer to 220° C. for 5 hours and then to 280° C. for another 5 hours. Post mold annealing is preferred but not essential. Aurum™ is suitable for composite gudgeons as well as gudgeons that are completely of glass filled polymer. Aurum™ is commercially available in amorphous, and semi-crystalline states, with 30–40 weight % glass in the crystalline grade and 0 to 40 weight % glass in the amorphous grade. This could be upgraded to 50% or more, e.g., if greater tensile strength is needed. For the present invention, 40 weight % glass in the crystalline grade is preferred. For maximum high temperature strength, a higher glass content is preferred; for lower thermal conductivity, a lower glass content is preferred. Depending on the properties desired, the glass content can be varied within a useful range of 20 to 50 weight percent.

For the present invention, 30–40 weight percent is preferred because this grade provides a marked improvement over thermoset polyimides with respect to conductivity as measured by taking the fuser thermal profiles for the lower rear bearing, the upper rear bearing, the upper front bearing and the front fuser frame during a 110 lb. paper run. See results in FIGS. 3–6. The importance of preventing heat loss from the ends of the roller to the environment has already been discussed.

Aurum™ has a thermal expansion (coefficient of expansion) characteristic that approximates, (i.e. almost the same as) the roller core so that repeated heating and cooling of these two materials will not cause unequal thermal expansion or contraction which, if it occurred, would cause the gudgeon to rotate loosely leading to wear/friction. With Aurum™, the gudgeon remains in coupled engagement with the fusing roller throughout the operating range of temperatures. At room temperature the interference fit between the gudgeon and the core varies between 0.003" and 0.007" and, with the gudgeon of the invention, this fit is maintained throughout the operating range of temperatures.

In addition to the close interference fit, the invention also provides a retaining ring to prevent the gudgeon from moving along the axis of the roller. There is also a key way to ensure that there is no rotational motion between the gudgeon and core.

The injection molding is carried out according to the manufacturer' suggestions. The product requires drying before processing using a circulating air oven, equipped preferably with a dehumidifier. Drying temperatures are: 220° C. for 7–8 hours; or in both instances; 200° C. for 8–10 hours, or; 180° C. for 10+ hours. Most conventional reciprocating screw injection molding machines with temperature capability to 400° C.–415° C. are suitable for molding Aurum™. Corrosion resistant metals are recommended.

DETAILED DESCRIPTION OF THE DRAWINGS

Referring now to the drawings, an internally heated roller 10 is shown with a gudgeon 12 for supporting the roller. For ease of illustration only one end of the roller 10 and its respective gudgeon is shown, the opposite end being preferably of identical (but mirrored) construction. At least one of the gudgeons is rotatively driven by a power source (not shown) through lugs 12a about longitudinal axis A of the roller. The roller 10 may have an internal heat source, such as a lamp 16 and includes a cylindrical core 18 of heat conducting material, such as aluminum or steel, having a coating 18a. The thermal conductivity of the core 18 enables the roller to be used in applications where heat transmission through the peripheral surface of the roller is desired. When the roller 10 is to be used, for example, as a fuser roller for fixing toned images in a printer or electrophotographic copier, the core 18 may be covered with a heat conducting compliant coating, sometimes called a sleeve 20, such as aluminum oxide or iron oxide filled silicone rubber providing a desirable offset preventing surface. The end of the core 18 includes a concentric bore 22 having an interior end wall or shoulder 22a which forms a seat for the gudgeon 12.

The gudgeon 12 is formed of a material of relatively low thermal conductivity, but high strength characteristics.

A gudgeon formed of any of the preferred materials substantially reduces heat loss through the ends of the heated roller, and is of sufficient strength to support and transmit rotation to the roller. A concentric bore 24 may be formed in the gudgeon to accept a heat shield 26 (optional but preferred) for further decreasing heat losses through the end of the roller. The gudgeon 12 has an annular shoulder 28, the diameter of which is substantially equal to the diameter of the bore 22 and is received in the bore against end wall 22a. This may be an interference fit as described below.

The drive interconnection between the gudgeon 12 and the roller 10 may be provided by a keyway 30 in shoulder 28 of the gudgeon which mates with a key 32 integral with the core 18 and extending into the bore 22. There is a nominal interference fit between gudgeon and core of 0.003" to 0.007" and preferably 0.005" at room temperature. Alternatively, the key may be an independent member inserted in a keyway formed by complimentary shaped openings in the shoulder 28 and the core 18. Thus, when the gudgeon 12 is rotated, the roller 10 is rotatively driven about its longitudinal axis.

In an electrophotographic copier, for example, the lamp 16 may heat the roller core 18 over an operative range from room temperature to approximately 600° F., so that the coating 20 is of high enough temperature to accomplish fusing (approximately 375° F.). Heating of the roller core (and gudgeon 12) by the lamp may be continuous or intermittent. In either instance, the roller and gudgeon exhibit unequal thermal expansion or contraction during periods of temperature change due to the differing thermal expansion characteristics of their respective materials. As noted above, unequal expansion or construction can cause eccentricity in the drive of the roller by the gudgeon. This can be avoided or minimized by selecting for the core and the gudgeon materials that have coefficient of expansion values that are almost the same. That is, their thermal expansion characteristics are not very different. To further prevent such unequal thermal expansion or contraction from adversely affecting the drive coupling, a coupling element is provided to constantly urge the gudgeon 12 into engagement with end wall 22a of the bore 22 in the roller 10 effective when the interference fit is lost at fusing temperature. The coupling element is a substantially cylindrical open retaining ring 34 (e.g., a Tru Arc™ ring) formed of a radially resilient material so that the diameter of the ring may increase or decrease.

The retaining ring 34 is received in an annular groove 36 formed in the internal peripheral surface of the core 18 between the interior end wall 22a and the end of the roller 10. The groove 36 has a first side wall 36a and a second side wall 36b spaced from and angularly disposed to the first side wall. The diameter of the retaining ring 34 is selected so that in its free state, it is smaller than the maximum diameter of the groove 36, but larger than the minimum diameter. A peripheral edge 34a ring is beveled so as to be substantially complimentary to the side wall 36b of the groove.

Upon assembly, the core is heated with an induction heater so that the gudgeon sets properly into the core. The gudgeon 12 is seated on the end wall 22a of the bore 22 with the key 32 received in the keyway 30. The retaining ring 34 is then compressed and inserted into the groove 36. If the key is an independent member, the opening of the ring is positioned to straddle the keyway to enable the key to be inserted into the keyway. Because the ring is radially resilient, it expands in the groove until the beveled edge 34a engages the tapered side wall 36b. The location of the groove 36 between the end wall 22a and the end of the roller is particularly selected so that as the beveled edge 34a of the retaining ring 34 wedges against the tapered side wall 36b of the lateral surface 34b of the ring engages the shoulder 28 of the gudgeon and urges the gudgeon into positive engagement with the end wall 22a. The width of the groove is such that over the entire operative temperature range (and all thermal expansion or contraction of the core 18 and gudgeon 12) the ring 34 remains wedged in engagement between the shoulder 28 and the side wall 36b. Thus, the expansion force of the compressed ring exerted on the side wall 36b has a reaction component parallel to the axis A which causes the ring to constantly urge the shoulder 28 of the gudgeon into engagement with the end wall 22a over the entire operative temperature range. The gudgeon is thus captured in the roller 10; and further, the friction forces between the engaging surfaces increase the effectiveness of the drive coupling.

In operation, unequal thermal expansion or contraction of the gudgeon and roller, due to changes in temperature from heat generated by the lamp 16, could cause the portion of the shoulder 28 engaging the surface 34b of the retaining ring 34 to move axially relative to the groove 36. If the shoulder expands more than the core, an axial force is imparted to the retaining ring 34 to move the ring to the right in FIG. 1. In reaction to such axial force, the retaining ring 34 moves axially on the groove 36, with the beveled edge 34a sliding on the complimentary tapered wall 36b to radially compress the ring. On the other hand, if the shoulder expands less than the core (or contracts relative to the core), the ring is free to expand radially due to its resilience. Such radial expansion causes the ring to slide on the tapered wall 36b and move to the left in FIG. 1 to maintain engagement with the shoulder 28 and corresponding engagement of the shoulder and end wall 22a. Such axial and radial movement thus accommodates for the unequal thermal expansion or contraction of the gudgeon and roller while maintaining the gudgeon 12 securely seated against the end wall 22a of the bore 22. This insures the effectiveness of the drive coupling between the gudgeon and the roller over the entire operative temperature range, especially when the interference fit fails at operation temperature.

The invention has been described in detail with particular reference to certain preferred embodiments thereof, but it will be understood that variations and modifications can be effected within the spirit and scope of the invention.

| PARTS LIST | |
|---|---|
| longitudinal axis | A |
| roller | 10 |
| gudgeon | 12 |
| lugs | 12a |
| lamp | 16 |
| roller core | 18 |
| surface | 20 |
| concentric bore tube | 22 |
| interior end wall | 22a |
| gudgeon bore | 24 |
| heat shield | 26 |
| annular shoulder | 28 |
| keyway | 30 |
| key | 32 |
| substantially cylindrical open ring | 34 |
| beveled edge | 34a |
| lateral surface | 34b |
| groove | 36 |
| first side wall | 36a |
| second side wall | 36b |
| tapered side wall | 36b |

What is claimed is:

1. A gudgeon for a heated roller core, the gudgeon comprising a mounting mechanism which disposes said gudgeon to the roller core and to a driving means such that when the driving means is in use, the gudgeon rotates and transmits its rotation to the roller core, the gudgeon being molded from thermoplastic polyimide filled with 20 to 50 weight percent glass fiber.

2. The gudgeon of claim 1 wherein the polyimide is in a state selected from amorphous, and semi-crystalline.

3. The gudgeon of claim 2 wherein the polyimide is first in an amorphous state and is later annealed to a semi-crystalline state.

4. The gudgeon of claim 2 wherein the polyimide is filled with 40% glass fiber and is in a semi-crystalline state.

5. A gudgeon for a heated roller core, the gudgeon comprising a mounting mechanism which disposes said gudgeon to the roller core and to a driving means such that when the driving means is in use, the gudgeon rotates and transmits its rotation to the roller core, the roller rotating inside the bearing, the bearing supported on a frame, the gudgeon being of a polyimide material having a first thermal conductivity characteristic, and the roller core being of a second material having a second thermal conductivity characteristic, such that when the roller core and the gudgeon are in use, heat from the roller core through the gudgeon to the bearings and frame is minimized.

6. A gudgeon for a heated roller core, the gudgeon comprising a mounting mechanism which disposes said gudgeon to the roller core and to a driving means such that when the driving means is in use, the gudgeon rotates and transmits its rotation to the roller core, the gudgeon being of a polyimide material having a first thermal expansion characteristic and the roller core of a second material having a second thermal expansion characteristic, wherein the first thermal expansion characteristic approximates the second thermal expansion characteristic, and whereby the gudgeon remains in coupled engagement with the fusing roller throughout an operating range of temperatures.

7. The gudgeon of claim 6 wherein an interference fit between the gudgeon and the core of 0.003" to 0.007" at room temperature is maintained.

8. The gudgeon of claim 6 wherein an interference fit between the gudgeon and the core of about 0.005" at room temperature is maintained.

9. The gudgeon of claim 1, 5 or 6 wherein the polyimide material is filled with 20 to 50 weight percent glass fiber.

10. The gudgeon of claim 5 or 6 wherein the second material is a metal.

11. The gudgeon of claim 10 wherein the metal is aluminum.

12. A roller assembly comprising:

a core;

a heat source;

a mounting mechanism for said roller; and the gudgeon of claim 1, 5, or 6 in coupled engagement to the core with a nominal interference fit between the gudgeon and the core of 0.003" to 0.007" at room temperature.

* * * * *